US006776443B2

(12) United States Patent
Shimura et al.

(10) Patent No.: US 6,776,443 B2
(45) Date of Patent: Aug. 17, 2004

(54) OPENING AND CLOSING APPARATUS OF VEHICULAR OPENING AND CLOSING MEMBER

(75) Inventors: Ryoji Shimura, Yokohama (JP); Hidemasa Hirakui, Yokohama (JP); Toshihisa Omori, Wako (JP)

(73) Assignees: Ohi Seisakusho Co., Ltd., Kanagawa (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/682,648

(22) Filed: Oct. 8, 2003

(65) Prior Publication Data

US 2004/0104594 A1 Jun. 3, 2004

(30) Foreign Application Priority Data

Oct. 9, 2002 (JP) ...................................... 2002-295610

(51) Int. Cl.[7] .................................................. B60J 5/00
(52) U.S. Cl. ......................... 296/56; 296/146.8; 49/341
(58) Field of Search ............................... 296/56, 146.8; 49/340–342

(56) References Cited

U.S. PATENT DOCUMENTS 6,142,551 A * 11/2000 Ciavaglia et al. ............. 296/56
6,367,199 B2 * 4/2002 Sedlak et al. ................. 49/340
6,382,706 B2 * 5/2002 Yuge et al. .............. 296/146.4
6,513,859 B2 * 2/2003 Yuge ....................... 296/146.4
6,550,839 B2 * 4/2003 Rogers et al. ................ 296/56
6,676,190 B2 * 1/2004 Daniels et al. .............. 296/106

FOREIGN PATENT DOCUMENTS

JP 2001-280000 10/2001

* cited by examiner

*Primary Examiner*—Stephen Gordon
(74) *Attorney, Agent, or Firm*—Merchant & Gould, P.C.

(57) ABSTRACT

A rack includes a closed position teeth portion meshed with a teeth portion of an output gear when the rack is disposed at a closed position corresponding to a closed position of an opening and closing member and an opened position teeth portion meshed with the teeth portion of the output gear when the rack is disposed at an opened position corresponding to an opened position of the opening and closing member and a clearance between faces of teeth of the closed position teeth portion and the teeth portion of the output gear is made larger than a clearance between faces of teeth of the opened position teeth portion and the teeth portion of the output gear.

6 Claims, 8 Drawing Sheets

OPENING AND CLOSING APPARATUS OF VEHICULAR OPENING AND CLOSING MEMBER

The present application is based on Japanese Patent Application No. 2002-295610, the entire contents of which are incorporated herein by reference.

BACKGROUND OF THE INVENTION

1. Field of the Invention

The present invention relates to an opening and closing apparatus of a vehicular opening and closing member for connecting an opening and closing member pivotably attached to a vehicular body openably and closably and a rack meshed with an output gear pivotably supported by a side of the vehicle body and moved by rotating the output gear and moving the to open said close the opening and closing member by moving the rack.

2. Related Art

According to an opening and closing apparatus of a vehicular opening and closing member of a related art, a driving unit having a regularly and reversely rotatable motor, a gear box provided with an output gear for reducing to output rotation of the motor and a rack meshed with an output gear and reciprocally moved in a front and gear direction is installed at a space between a lower face side of a roof panel and a roof trim on an inner side of a vehicle compartment, a rear end portion of the rack is connected to a side of an opening and closing member of a rear gate or the like pivotably attached openably and closably in an up and down direction by a hinge shaft directed in a left and right direction of a vehicle body and the opening and closing member is pivoted in an opening direction and a closing direction by reciprocally moving the rack in the front and rear direction by rotating the output gear (refer to, for example, Japanese Patent Publication No. JP-A-2001-280000).

However, according to the above-described opening and closing apparatus of a vehicular opening and closing member of the related art, there is a concern of transmitting vibration of the opening and closing member disposed at a closed position in running the vehicle to the output pinion meshed with the rack via the rack and the vibration transmitted to the output pinion is transmitted to the gear box, the vehicle body and the like to emit large vibration sound.

SUMMARY OF THE INVENTION

In view of the above-described problem provided to the related art, it is an object of the invention to provide an opening and closing apparatus of a vehicular opening and closing member preventing vibration from being transmitted to a side of an output gear when the opening and closing member is disposed at a closed position.

According to the invention, the above-described program is solved as follows.

(1) An opening and closing apparatus adapted for opening and closing an opening and closing member pivotably attached to a vehicle body, the opening and closing apparatus comprising:

an output gear pivotably supported in a side of the vehicle body;

a rack meshed with the output gear, the rack being moved by a rotation of the output gear and so as to open and close the opening and closing member by moving the rack, the rack including a first teeth portion and a second teeth portion, wherein the rack is meshed with the output gear at the first teeth portion when the opening and closing member is opened, and the rack is meshed with the output gear at the second teeth portion when the opening and closing member is closed, and a clearance between a tooth surface of a tooth in the second teeth portion and a mating tooth of the output gear is larger than a clearance between a tooth surface of a tooth of the first teeth portion and a mating tooth of the output gear.

(2) In the above-described item (1), a reference pitch line of the second teeth portion may be shifted from a reference pitch line of the first teeth portion in a direction of being remote from the output gear.

(3) In the above-described item (1), a tooth width of a tooth in the second teeth portion may be smaller than a tooth width of a tooth in the first teeth portion.

(4) Another aspect of the invention provides:

An opening and closing apparatus adapted for opening and closing an opening and closing member pivotably attached to a vehicle body, the opening and closing apparatus comprising:

an output gear pivotably supported in a side of the vehicle body;

a rack meshed with the output gear, the rack being moved by a rotation of the output gear and so as to open and close the opening and closing member by moving the rack, the rack including a first teeth portion and a second teeth portion, wherein the rack is meshed with the output gear at the first teeth portion when the opening and closing member is opened, and the rack is meshed with the output gear at the second teeth portion when the opening and closing member is closed, and a distance between opposing tooth surfaces in each adjacent teeth in the second teeth portion is made larger than a distance between opposing tooth surfaces in each adjacent teeth in the first teeth portion.

DETAILED DESCRIPTION OF THE PREFERRED EMBODIMENTS

An embodiment according to the invention will be explained in reference to FIG. 1 through FIG. 9 as follows.

Figure 1:
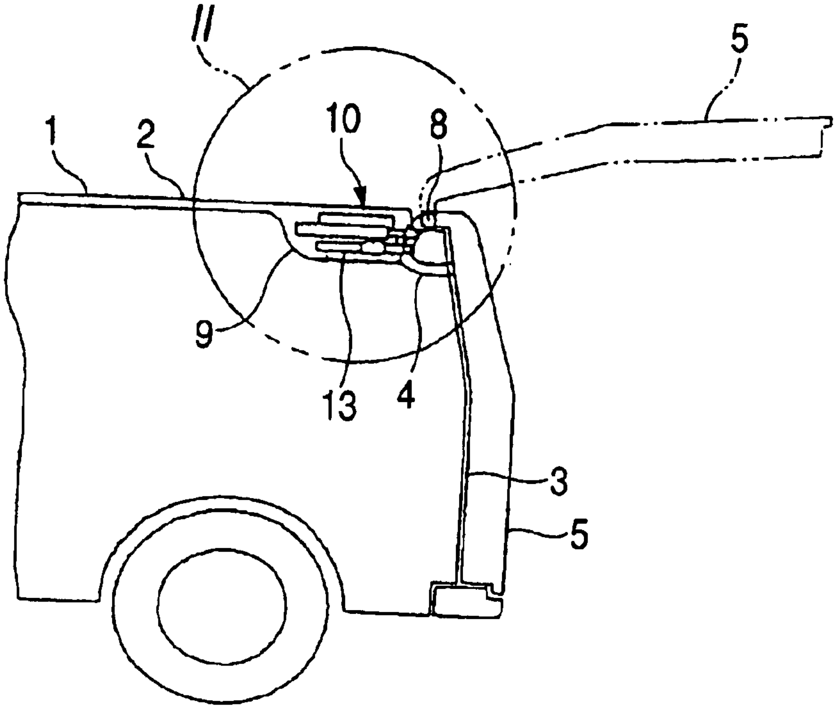
FIG. 1 is a side view of a rear portion of a vehicle body showing an outline of a first embodiment according to the invention.
Figure 2:
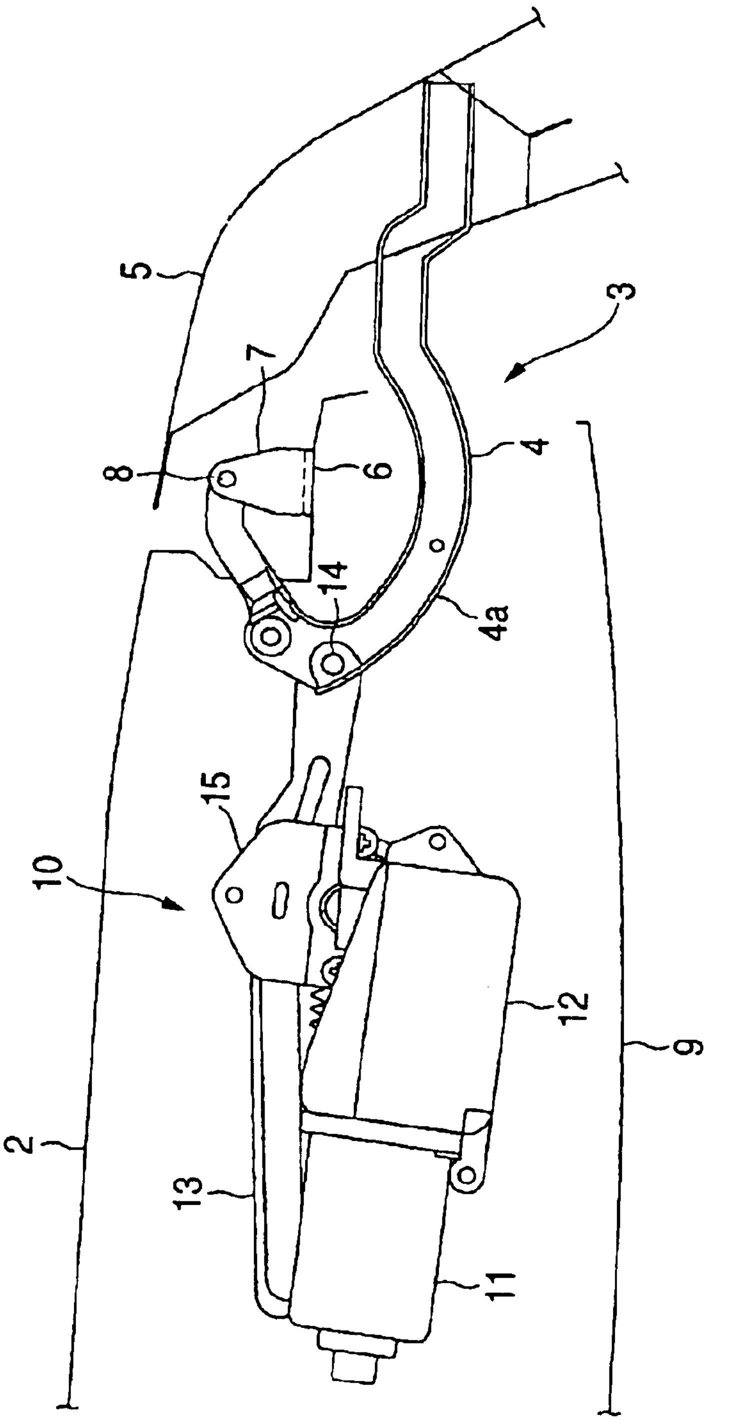
FIG. 2 is an enlarged view of a portion indicated with II in FIG. 1 of the first embodiment according to the invention.
Figure 3:
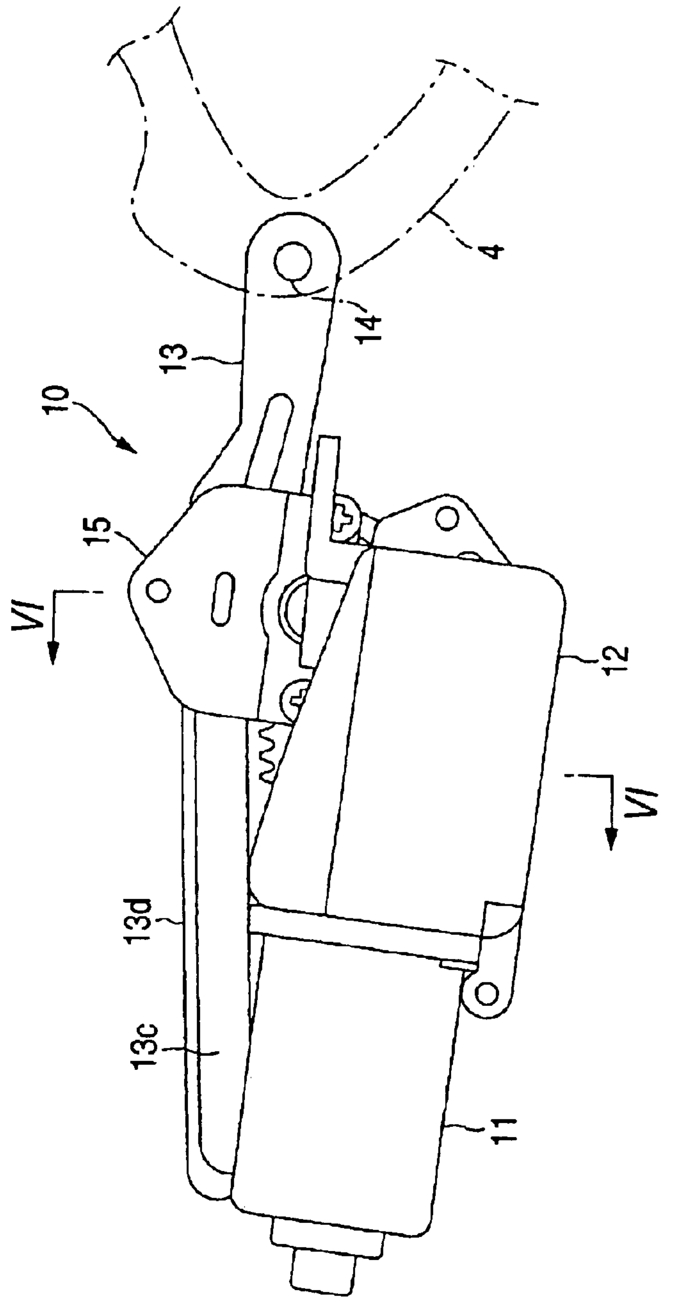
FIG. 3 is a side view of a drive unit of the first embodiment according to the invention.
Figure 4:
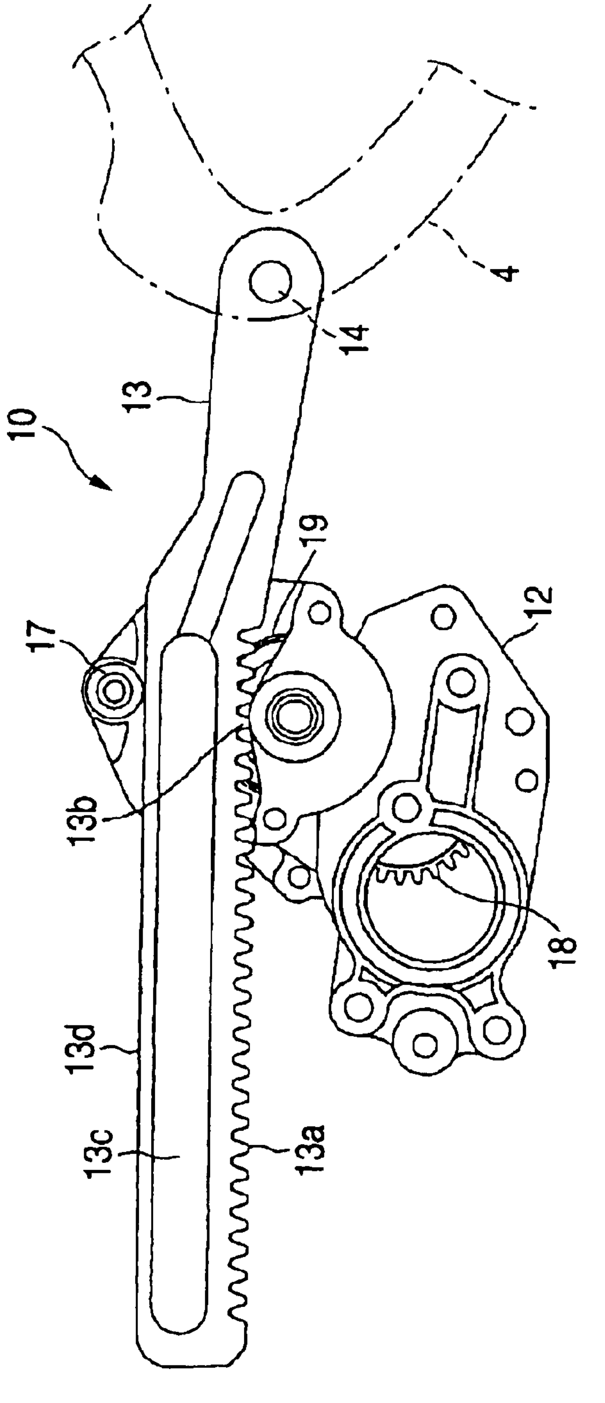
FIG. 4 is a side view of a state in which a motor of the drive unit is removed of the first embodiment according to the invention.
Figure 5:
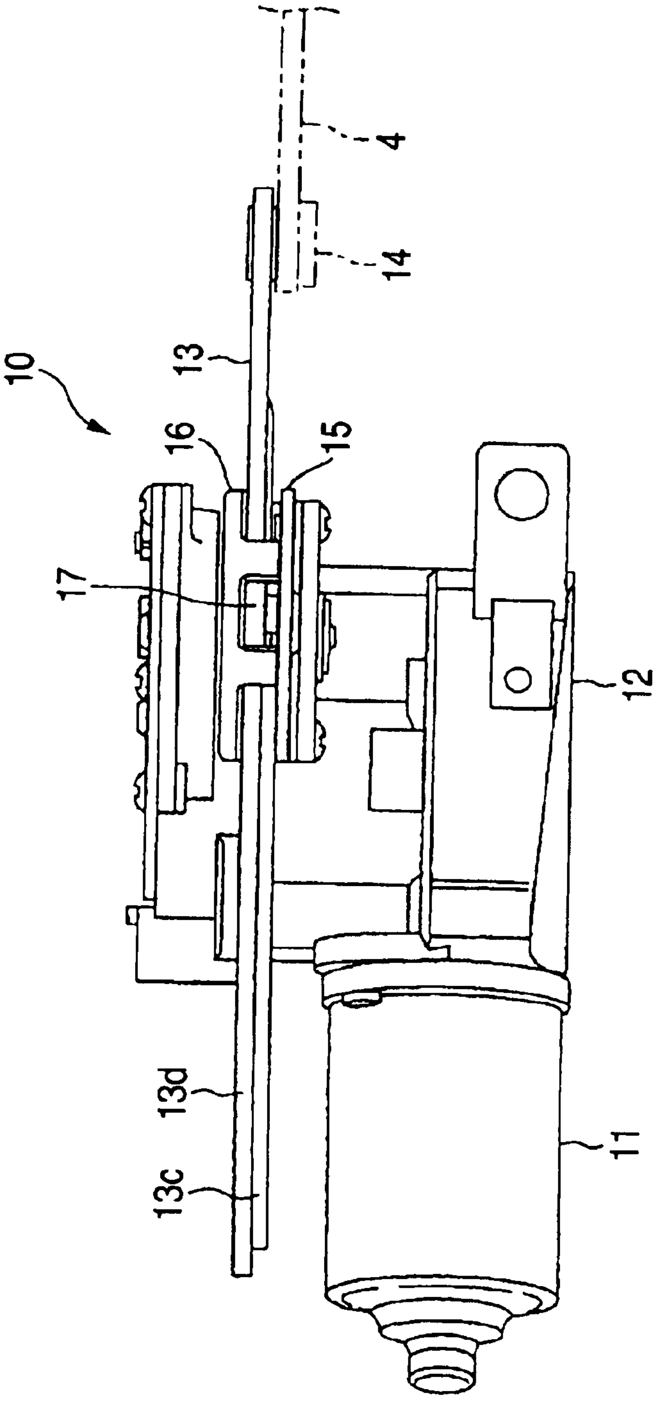
FIG. 5 is a plane view of the drive unit of the first embodiment according to the invention.
Figure 6:
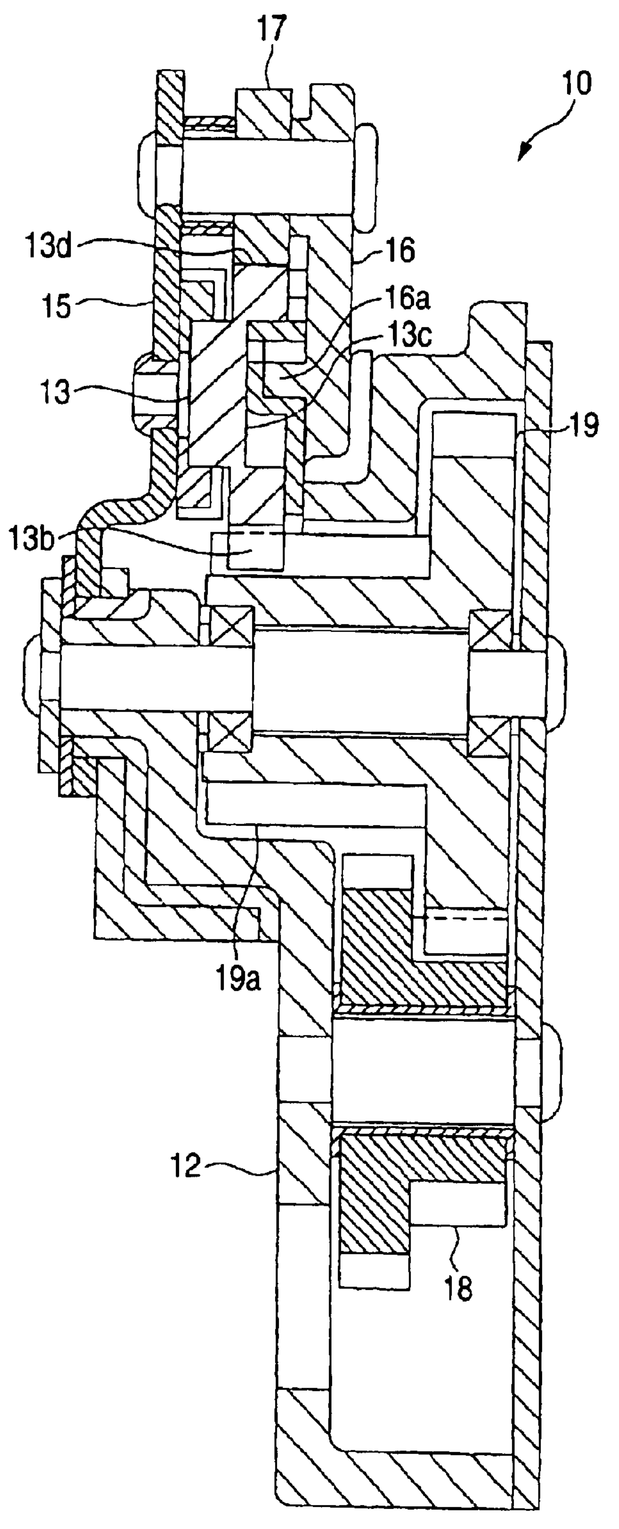
FIG. 6 is a vertical sectional view enlarging a state of removing the motor of the drive unit along line VI—VI in FIG. 3.
Figure 7:
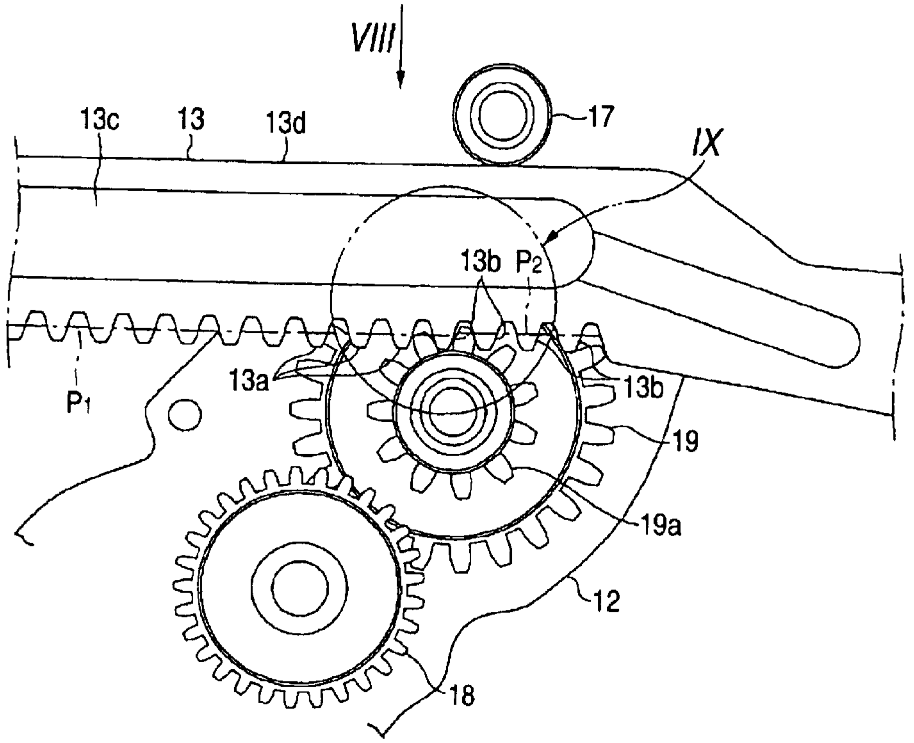
FIG. 7 is a side view enlarging an essential portion of the first embodiment according to the invention.
Figure 8:
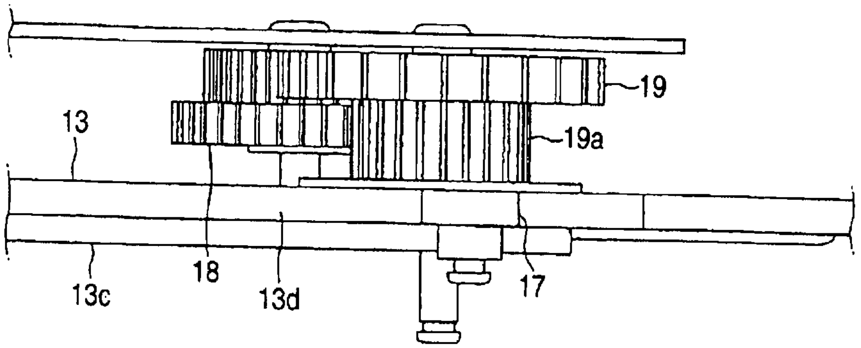
FIG. 8 is a view shown in a direction indicated with a VIII arrow mark in FIG. 7.
Figure 9:
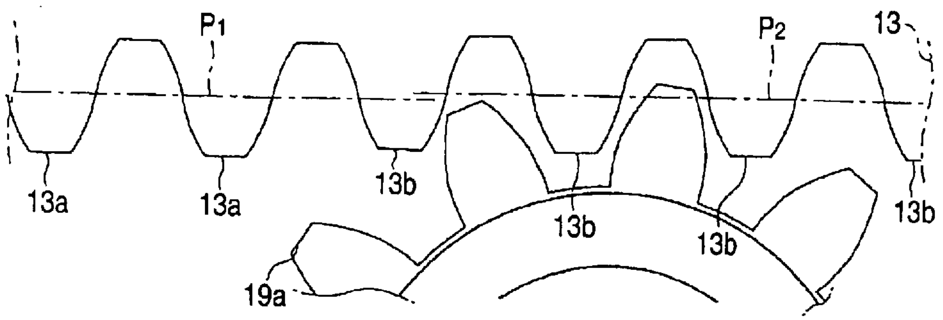
FIG. 9 is a side view enlarging a IX portion of FIG. 7.

FIG. 1 is a side view of a rear portion of a vehicle body having the embodiment, FIG. 2 is an enlarged view of a portion II in FIG. 1, FIG. 3 is a side view of a drive unit, FIG. 4 is a side view of a state in which a motor of the drive unit is removed, FIG. 5 is a plane view of the drive unit, FIG. 6 is a vertical sectional view enlarging the state of removing the motor of the drive unit taken along a VI—VI of FIG. 3, FIG. 7 is a side view enlarging an essential portion, FIG. 8 is a view viewing FIG. 7 from an arrow mark VIII, FIG. 9 is an enlarged side view of a IX portion of FIG. 7. Further, in the following explanation, in FIG. 1 and FIG. 2, a left direction is defined as "front direction" and a right direction is defined a s "rear direction ".

At the rear portion of a vehicle body (1) an opening portion (3) is formed by left and right rear pillars (not illustrated) and a rear edge of a roof panel (2), and the opening portion (3) can be opened and closed by a rear gate (5) constituting an opening and closing member pivotably attached thereto in an up and down direction via a pair of left and right hinge arms (4).

As shown by FIG. 2, a base end of the hinge arm (4) is pivotably attached to a hinge bracket (7) fixedly attached to an upper face of a rear roof rail (6) extended in a vehicle width direction along an upper edge portion of the opening portion (3) by a hinge shaft (8) directed in a left and right direction and the rear gate (5) is fixed with a rear end portion of a curved portion (4*a*) directed from the base end to the front direction in a skewed lower direction, constituting a shape of a circular arc centering of the hinge shaft (8) from a front end thereof and directed in the rear direction.

The rear gate (5) is driven to open and close over between a closed portion designated by a bold line in FIG. 1 and an opened position designated by a two-dotted chain line by a drive unit (10) installed on a side of the vehicle body (1) between a lower face of the roof panel (2) and a roof trim (9) on an inner side of a vehicle compartment which is made to span on a lower side of the roof panel (2).

The drive unit (10) includes a regularly and reversely rotatable motor (11), a gear box (12) and a rack (13).

In a longitudinal direction of a lower edge of the rack (13) there are continuously provided pluralities of gears of an opened position teeth portion (13*a*) (corresponding to "first teeth portion" of the invention) and a closed position teeth portion (13*b*) (corresponding to "second teeth portion" of the invention) which are capable of being meshed with a teeth portion (19*a*) of an output gear (19), mentioned later. A rear end portion of the rack (13) is connected to the curved portion (4*a*) of the hinge arm (4) by a connecting shaft (14) directed in the left and right direction.

Two left and right side faces of the rack (13) are interposed between support plates (15) and (16) pivotably provided at an upper portion of the gear box (12) slidably in the front and rear direction. One side face of the rack (13) is provided with a guide groove (13*c*) in a recessed shape along a longitudinal (moving) direction of the rack (13). The guide groove (13*c*) is loosely fitted slidably with a projected portion (16*a*) projected to an inner side of the support plate (16). By engaging the guide groove (13*c*) and the projected portion (16*a*), an interval between the rack (13) and the output gear (19) in the up and down direction is maintained.

An upper edge (13*d*) of the rack (13) is guided in the front and rear direction by a guide member (17) pivotably attached between the support plates (15) and (16).

As mainly shown by FIG. 6 and FIG. 7, the gear box (12) is pivotably attached with an intermediate gear (18) which is meshed with a pinion (not illustrated) rotated by the motor (11) via an electromagnetic clutch (not illustrated) provided at inside of the gear box (12) and the output gear (19) which is meshed with the intermediate gear (18) and the teeth portion (19*a*) of which can be meshed with the opened position teeth portion (13*a*) and the closed position teeth portion (13*b*) of the rack (13).

As shown by FIG. 2 through FIG. 5 and FIG. 7 through FIG. 9, when the rear gate (5) is disposed at a closed position, the rack (13) is disposed at a closed position corresponding to the closed position of the rear gate (5) and the closed position teeth portion (13*b*) is meshed with the teeth portion (19*a*) of the output gear (19). When an operation switch (not illustrated) is operated in the state, the electromagnetic clutch is brought into a connected state, the motor (11) is rotated and the output gear (19) is rotated in the clockwise direction in FIG. 7 and FIG. 9. Thereby, the rack (13) is moved in the right direction from the closed position to thereby move the rear gate (5) in an opening direction. When the rack (13) is moved from the closed position to an opened position corresponding to an opened position of the rear gate (5), the opened position teeth portion (13*a*) of the rack (13) is meshed with the teeth portion (19*a*) of the output gear (19).

While the rear gate (5) is disposed at the opened position, when the motor (11) is rotated reversely by operating the operation switch, the rack (13) the opened position teeth portion (13*a*) of which is meshed with the teeth portion (19*a*) of the output gear (19) is moved in the left direction to thereby move to the closed position and in accordance therewith, the rear gate (5) is moved to the closed position.

As shown by FIG. 7 and FIG. 9, a reference pitch line (P2) of the closed position teeth position (13*b*) is shifted from a reference pitch line (P1) of the opened position teeth portion (13*a*) in an outer direction (a direction of being remote from the teeth portion (19*a*) of the output gear (19)). Thereby, when the rack (13) is disposed at the closed position, the backlash (a clearance between tooth surfaces of teeth meshed with each other) between the closed position teeth portion (13*b*) and the teeth portion (19*a*) of the output gear (19) becomes larger than the backlash between the opened position teeth portion (13*a*) and the teeth portion (19*a*) which are meshed with each other when the rack (13) is disposed at the opened position.

Therefore, when the rack (13) is disposed at the closed position, the contact between the tooth surfaces of the teeth of the closed position teeth portion (13*b*) and the teeth portion (19*a*) in all the time is excluded, vibration transmitted from the rear gate (5) disposed at the closed position in running the vehicle is shut off by the clearance between the closed position teeth portion (13*b*) and the teeth portion (19*a*) of the output gear (19) and the vibration of the rear gate (5) is not transmitted to the gear box (12), the vehicle body (1) and the like via the output gear (19) as in the related art (particularly, sound of bringing gears in mesh with each other emitted between the intermediate gear (18) and the output gear(19)).

Figure 10:
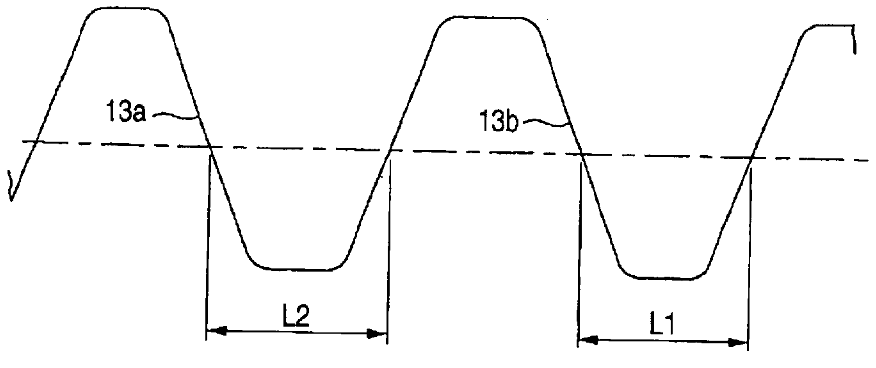
FIG. 10 is a side view enlarging an essential portion of a second embodiment according to the invention.

FIG. 10 shows a second embodiment of the invention. According to the embodiment, a tooth width (L1) of the closed position teeth portion (13*b*) in the rack (13) is made narrower than a tooth width (L2) of the opened position teeth portion (13*a*). Thereby, when the rack (13) is disposed at the closed position, a clearance between tooth surfaces of teeth contiguous to each other of the closed position teeth portion (13*b*) and the teethportion (19*a*) of the output gear (19) becomes larger than a clearance between surfaces of teeth contiguous to each other of the opened position teeth portion (13*a*) and the teeth portion (19*a*), thereby, transmission of vibration from the rear gate (5) can be shut off similar to the above-described embodiment.

Further, the invention is not specified only to the rear gate but is applicable to other opening and closing member of a hood, a trunk lid or the like other than the rear gate.

According to the invention, the following effect can be achieved.

(a) According to the invention, by making the clearance between the surfaces of the teeth of the closed position teeth portion of the rack and the teeth portion of the output gear larger than the clearance between the surfaces of the teeth of the opened position teeth portion and the teeth portion of the output gear, vibration of the opening and closing member when the opening and closing member is disposed at the closed position is shut off by the clearance between the faces of the teeth of the closed position teeth portion and the teeth portion of the output gear and vibration can be prevented from being transmitted to a side of the output gear.

(b) According to the invention, the vibration can firmly be prevented from being transmitted to a side of the output gear.

What is claimed is:

1. An opening and closing apparatus adapted for opening and closing an opening and closing member pivotably attached to a vehicle body, the opening and closing apparatus comprising:

an output gear pivotably supported in a side of the vehicle body;

a rack meshed with the output gear, the rack being moved by a rotation of the output gear and so as to open and close the opening and closing member by moving the rack, the rack including a first teeth portion and a second teeth portion, wherein the rack is meshed with the output gear at the first teeth portion when the opening and closing member is opened, and the rack is meshed with the output gear at the second teeth portion when the opening and closing member is closed, and a clearance between a tooth surface of a tooth in the second teeth portion and a mating tooth of the output gear is larger than a clearance between a tooth surface of a tooth of the first teeth portion and a mating tooth of the output gear.

2. The opening and closing apparatus of a vehicular opening and closing member according to claim 1, wherein a reference pitch line of the second teeth portion is shifted from a reference pitch line of the first teeth portion in a direction of being remote from the output gear.

3. The opening and closing apparatus according to claim 1, wherein a tooth width of a tooth in the second teeth portion is smaller than a tooth width of a tooth in the first teeth portion.

4. An opening and closing apparatus adapted for opening and closing an opening and closing member pivotably attached to a vehicle body, the opening and closing apparatus comprising:

an output gear pivotably supported in a side of the vehicle body;

a rack meshed with the output gear, the rack being moved by a rotation of the output gear and so as to open and close the opening and closing member by moving the rack, the rack including a first teeth portion and a second teeth portion wherein the rack is meshed with the output gear at the first teeth portion when the opening and closing member is opened, and the rack is meshed with the output gear at the second teeth portion when the opening and closing member is closed, and a distance between opposing tooth surfaces in each adjacent teeth in the second teeth portion is larger than a distance between opposing tooth surfaces in each adjacent teeth in the first teeth portion.

5. The opening and closing apparatus of a vehicular opening and closing member according to claim 4, wherein a reference pitch line of the second teeth portion is shifted from a reference pitch line of the first teeth portion thereof in a direction of being remote from the output gear.

6. The opening and closing apparatus of a vehicular opening and closing member according to claim 4, wherein a tooth width of a tooth in the second teeth portion is smaller than a tooth width of a tooth in the first teeth portion.

* * * * *